March 13, 1951 L. N. HADLEY, JR 2,544,832

VARIABLE FREQUENCY TANK CIRCUIT

Filed Aug. 8, 1945 2 Sheets-Sheet 1

Inventor

Lawrence N. Hadley Jr.

By Ralph L. Chappell

Attorney

March 13, 1951 L. N. HADLEY, JR 2,544,832

VARIABLE FREQUENCY TANK CIRCUIT

Filed Aug. 8, 1945 2 Sheets-Sheet 2

Inventor

Lawrence N. Hadley Jr.

By Ralph L Chappell

Attorney

Patented Mar. 13, 1951

2,544,832

UNITED STATES PATENT OFFICE 2,544,832

VARIABLE FREQUENCY TANK CIRCUIT

Lawrence N. Hadley, Jr., Ann Arbor, Mich., assignor to the United States of America as represented by the Secretary of the Navy Application August 8, 1945, Serial No. 609,667

5 Claims. (Cl. 250—36)

This invention relates to ultra-high-frequency oscillation circuits particularly for use as ultra-high-frequency tank circuits and in push-pull ultra-high-frequency oscillators.

This invention makes use of two parallel resonant-line oscillation circuits each in the form of a circular loop or a closed ring. In its broadest aspect, the invention comprises grid and plate tank units each formed of two spaced metal rings in parallel or juxtaposed relation, in a manner simulating parallel resonant lines, and connected together at opposing points by a common connector or permanent shorting bar. The rings of the grid tank unit at a point diametrically opposite the fixed shorting bar on each ring are connected individually to the control electrode of the push-pull tubes while the individual rings of the plate tank unit have separate connnection on each ring at a point diametrically opposite the fixed shorting bar to the anode or plate of the different tubes in push-pull. The fixed shorting bar in the grid tank unit is grounded while that of the plate tank unit is connected to some source of high voltage. Movable shorting bars or bridging members are provided for tuning the respective tank units, each of said movable bridging members being slidable on both rings of the associated tank unit in a circular path, the bridging members being constructed and arranged for movement simultaneously and automatically into their respective adjusted positions.

It is accordingly an object of this invention to provide such an oscillation circuit which may be used in ultra-high-frequency oscillators and other high frequency radio equipment.

Another object of the invention is to provide an improved variable frequency tank circuit for use in ultra-high-frequency oscillators for eliminating "key thump."

A further object of the invention is to provide tank oscillation circuits of circular loop form particularly adapted to ultra-high-frequencies.

Other objects, features and advantages of the invention will be apparent from the following particular description of a preferred embodiment thereof taken in connection with the accompanying drawing, in which.

Figure 1:
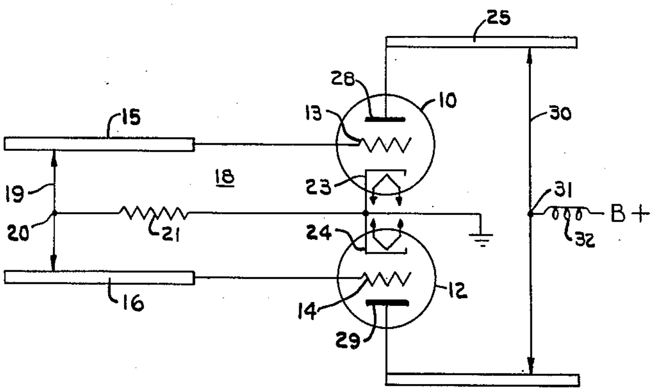
Fig. 1 is a top plan view showing diagrammatically a conventional parallel resonant line push-pull oscillator circuit in accordance with the prior art, the inclusion of this circuit being for the purpose of illustrating the extent of the improvement obtained by the present invention.
Figure 2:
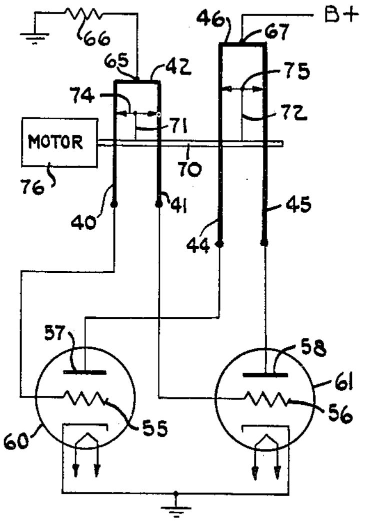
Fig. 2 is a diagrammatic view of the improved oscillator circuit in accordance with the present invention.
Figure 3:
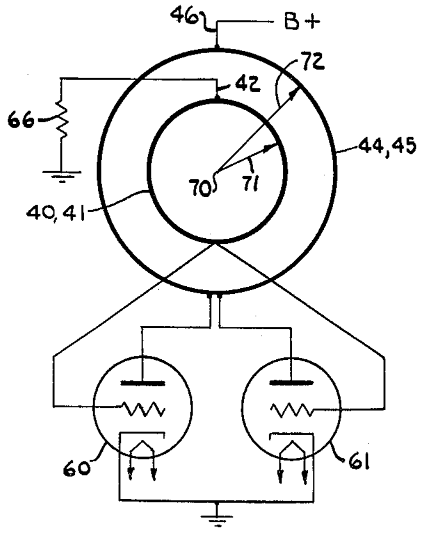
Fig. 3 is an end view of the invention embodied in Fig. 2 showing diagrammatically the novel circular ring arrangement of the parallel resonant lines and in which the inductance is varied by the use of circularly adjustable shorting bars or bridging members.

Thus, referring to Fig. 1, which is a top plan view of a conventional parallel resonant-line push-pull variable frequency U.-H.-F. oscillator constructed in accordance with the prior art and is included for purposes of illustrating the improvement obtained by the improved parallel line oscillator tank circuit arrangement of the present invention as shown in Figs. 2 and 3 and the advantages attendant thereto. In Fig. 1, a pair of triode tubes 10 and 12 are connected in push-pull relation. The grids 13 and 14 are connected to the conductors 15 and 16 of a transmission line 18. A slide bridge 19 is adjusted on the line conductors 15 and 16 until a quarter wave length characteristic is obtained. The center 20 of the bridge 19 is grounded through a grid leak resistor 21. The cathodes 23 and 24 are also grounded, and they may be heated by any suitable source (not shown). Conductors 25 and 26 of a second transmission line 27 are connected to the anodes or plates 28 and 29 of tubes 10 and 12 respectively. An adjustable bridging member 30 is connected to the transmission line conductors 25 and 26 at about a quarter wave length position at which the tuned-grid, tuned-plate circuit will cause oscillations. The center point 31 of the bridging member 30 is connected through a radio frequency choke 32 to the positive (B+) terminal of the anode current source (not shown) the negative terminal of which is grounded, all the above arrangements being in accordance with the prior art practice in the art.

Figure 4:
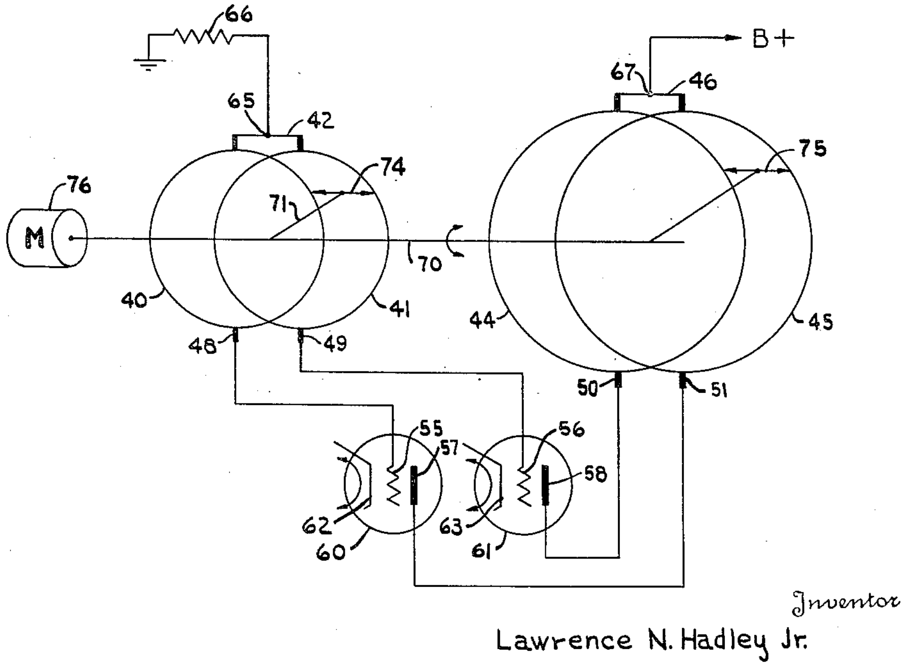
PRIOR ART FIG. 4
Fig. 4 illustrates diagrammatically a simple form of the loop tank circuit of the invention particularly for explaining the construction thereof.

Referring now to Figs. 2 and 3 which show the preferred embodiment of the invention as applied to an ultra-high-frequency oscillator circuit of the tuned grid tuned-plate type wherein each tuned circuit or tank unit comprises a pair of parallel inductance elements or line conductors in the form of juxtaposed continuous circular loops or metal rings formed of metal rods of similar size. The grid tank unit comprises ring members 40 and 41 connected together across opposed points by a fixed shorting bar or common conductive connector 42. The plate tank unit comprises the larger rings 44 and 45, of equal size, in juxtaposed relation connected together by a fixed shorting bar or common conductive connector 46. As illustrated in Fig. 4, the rings of the respective tank units are provided with suitable tabs 48, 49, 50 and 51 at points on the respective rings diammetrically opposite the point of attachment thereto of the fixed shorting members. Individual connection is provided to connect the control grids 55 and 56 and the anodes or plates 57 and 58 of the push-pull triodes 60 and 61 to the respective tabs abovementioned whereby the control grids of both tubes shall be interconnected by rings 40 and 41 of the grid tank unit and the plates of both tubes shall be interconnected by the rings 44 and 45 of the plate tank unit. The cathodes 62 and 63 of tubes 60 and 61 are shown as being of the indirectly heated type for convenience of illustration. The center points 65 of the fixed shorting bar 42 are grounded through grid leak resistor 66. The center point 67 of the fixed shorting bar 46 of the plate tank is connected to a suitable source of high voltage. The rings of both tank units have their axes on the same line of centers so that a shaft 70 to which is connected by arms 71 and 72 the two movable shorting bars or bridging members 74 and 75 may be driven simultaneously in a suitable manner, as by means of electric motor 76, to move the bars 74 and 75 in unison on the rings of their respective tank units. The movable shorting bars 74 and 75 are mounted in bridging relationship on their associated rings and they are slidable thereon in a circular path into positions to accomplish the desired frequency sweep.

Figure 5:
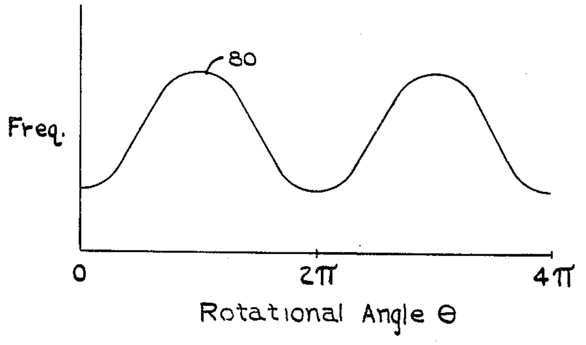
Fig. 5 is a graph of the output obtained from the oscillator disclosed in this invention.

Thus, the effective line length which the tubes 60 and 61 see is then the length around the circle in the shortest direction to the moving shorting bars 74 and 75 in parallel with the length around the circle in the other direction to the fixed shorting bars 42 and 46. The output from this oscillator system will be in accordance with the curve 80 in Fig. 5 wherein there is shown a plot of frequency vs. rotational angle of the movable shorting bars 74 and 75. It will be apparent that for continuous sweeping there is a cyclic varying frequency in the oscillator output as evidenced by no discontinuity in this curve—hence, no "key thump" to produce serious interference with communications outside the band of the transmitter.

While there has been described a preferred embodiment of the invention, it will be obvious to those skilled in the art that various changes and modifications may be made therein without departing from the spirit of the invention, and it is, therefore, to be distinctly understood that no limitations are intended other than are imposed by the scope of the appended claims as limited by the prior art.

What is claimed is:

1. In combination, two electron discharge devices each having a cathode, an anode, and a control element, a circuit interconnecting the control elements of both of said devices, said circuit including a pair of parallel closed ring conductors, and a common ground connection, a second circuit interconnecting the anodes of both of said devices, said second circuit including a pair of parallel closed ring conductors, and a connection to a high voltage plate supply source, and means for tuning each of said circuits individually, said means comprising a pair of slidable bridging members, one associated with each of said circuits, arranged to be actuated in unison.

2. An oscillation generator having, in combination, a pair of electron discharge devices in push-pull each comprising cathode, anode and control electrodes, four coaxial circular closed ring inductance elements disposed in parallel planes, two of said rings having a common connection and connecting together said anodes and the other two rings having a common connection and connecting together said control grids of said tubes, and a pair of movable shorting members, one bridging across the grid inductance rings and the other bridging across the anode inductance rings, said shorting members being slidable in a circular path on and along their associated rings, and means operatively connected to said movable shorting members to move them simultaneously on said rings.

3. In an oscillation generator, two vacuum tubes each having cathode, anode and control electrodes, an oscillation comprising two sets of parallel line conductors each in the form of a continuous metal ring, one set to form a grid tank and the other set a plate tank, the rings of the grid tank being individually connected at similar points along their periphery to the control electrode of a different tube and both rings being connected together at second point by a common connection to ground, the rings of the plate tank being individually connected at similar points along their periphery to the anode of a different tube and both rings of the plate tank being connected together at a second point by a common connection to a source of high voltage.

4. In an oscillation circuit, two sets of parallel line inductances each in the form of a closed circle, one set to form a grid tank unit and the other set a plate tank unit both circular inductances of each tank being connected together by a common connection, two adjustable bridging members one across and slidable on the circular inductances of the grid tank and the other across and slidable on the circular inductances of the plate tank, said bridging members being so constructed and arranged as to be movable simultaneously in a circular path on the associated inductances of the respective tanks, two vacuum tubes having cathode, anode and control electrodes, the control electrodes of both tubes being connected separately to the individual inductances of the grid tank and the anodes of said tubes being connected separately to the individual inductances of the plate tank, said grid tank being grounded and said plate tank being connected to a source of high potential.

5. In a push-pull vacuum tube oscillation generator, an oscillation circuit formed by two pairs of circular ring conductors in spaced parallel relation, the two rings of one pair of conductors being connected together at opposite points across from each other and thence to a common ground, each ring thereof also being separately connected to the control electrode of the push-pull vacuum tubes at a point on the ring diammetrically opposite the point of connection to ground, the two rings of the other pair of conductors being connected together at opposite points across from each conductor and thence to a source of high voltages, each ring also being separately connected to the anode of the different vacuum tubes, and a movable shorting bar bridging each pair of rings and slidable thereon in a circular path.

LAWRENCE N. HADLEY, JR.

REFERENCES CITED

The following references are of record in the file of this patent:

UNITED STATES PATENTS

| Number | Name | Date |
|---|---|---|
| 1,735,037 | Carpe | Nov. 12, 1929 |
| 1,983,848 | Gill | Dec. 11, 1934 |
| 2,113,758 | Devries et al. | Apr. 12, 1938 |
| 2,121,855 | Buschbeck | June 28, 1938 |
| 2,126,541 | De Forest | Aug. 9, 1938 |
| 2,147,809 | Alford | Feb. 21, 1939 |
| 2,190,131 | Alford | Feb. 13, 1940 |
| 2,367,693 | Segerstrom, Jr. | Jan. 23, 1945 |